…

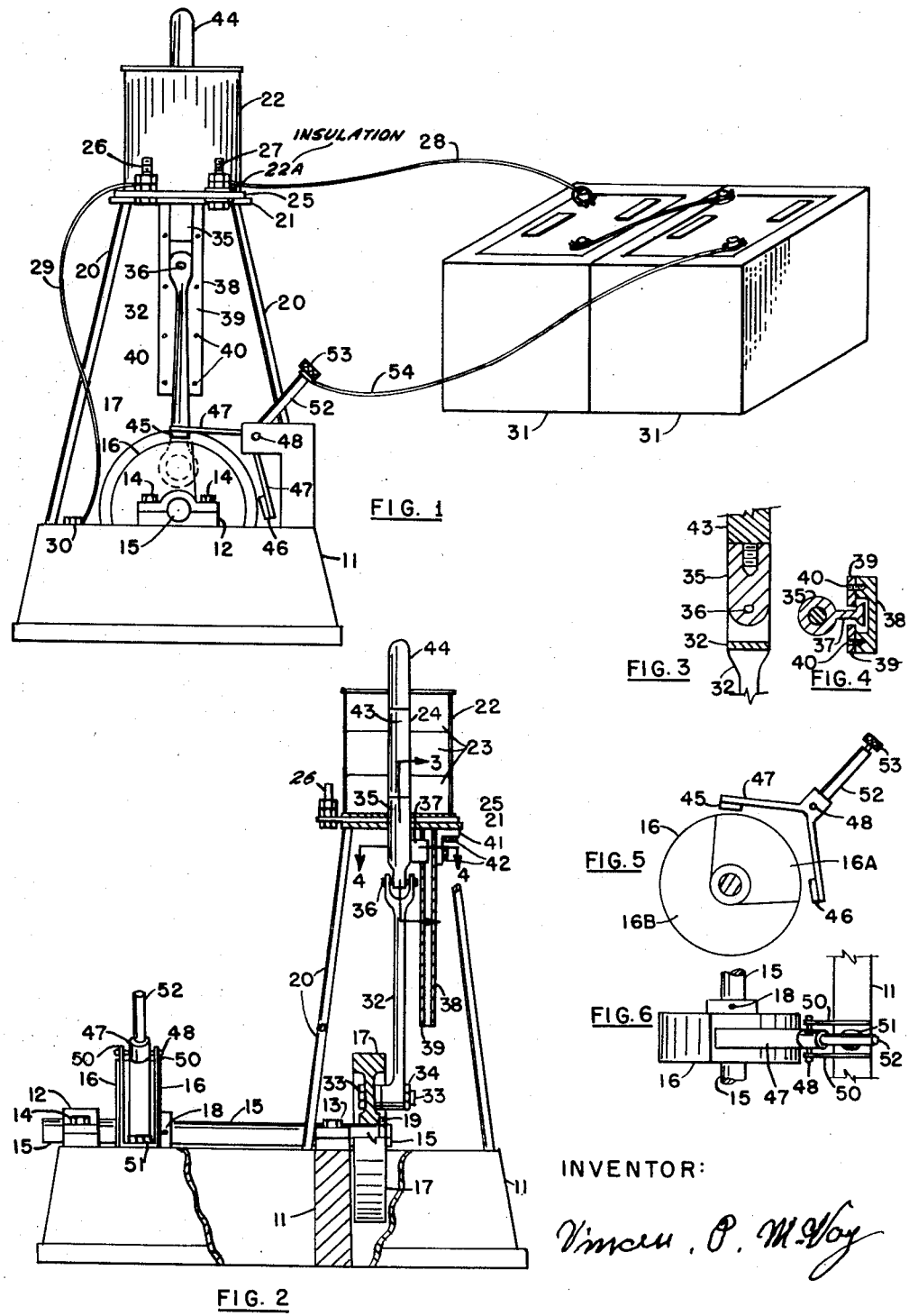

United States Patent Office 2,894,154
Patented July 7, 1959

2,894,154

ELECTRIC ENGINE

Vincen P. McVoy, Hammond, La.; by decree of distribution to Sue M. Dixon, Margaret M. Redell, and Garner M. Allen Application January 4, 1954, Serial No. 401,787

3 Claims. (Cl. 310—23)

The present invention relates to a new type electric engine and has for its main object and purpose to provide means of utilizing electric power to obtain a continuous operation of the engine without the continuous application of electricity.

One of the most important advantages found in this new invention resides in the extremely light weight of the completed engine. This is made possible through the use of aluminum or other light weight material for all the parts of this new engine with the exception of one small section of the piston rod.

Another advantage is found in the elimination of heat ordinarily found in engines. Since this new engine does not require compression to operate the fly wheel on the shaft, and since the cylinder is not airtight as in ordinary engines the use of metals which will stand up under intense heat is not required.

A still further advantage is found in the extreme low cost of manufacture. The precision work used in the manufacture of diesel, steam, gasoline, or other similar types of engines is eliminated in this new invention. Many accessory parts such as carburetor, fuel pump, water circulating pump, clutch, etc., are not needed, thus the cost of these parts may be added to the savings achieved in the lowered cost of manufacture.

The primary improvement as presented herein is the elimination of a constant application of electric power, yet the engine operates continuously.

With these and other advantages to be forwarded as we proceed I refer to the drawings in which like parts are denoted by the same reference characters throughout the several views, whereas:

Figure 1 is an end view of this new electric engine.

Figure 2 is a side elevation of same.

Figure 3 is a section of the attachment of the connecting rod to the guide as taken at 3—3 in Figure 2.

Figure 4 is a sectional view of the guide and guide plate as taken at 4—4 in Figure 2.

Figure 5 is a side elevation of the commutator.

Figure 6 is a plan view of the commutator.

Referring more particularly to the drawings:

The base 11 supports bearings 12 and 13 which are secured to the base 11 by bolts 14. These bearings 12 and 13 receive a shaft 15 which is positioned within the said bearings to allow a free rotation of the shaft 15. The shaft 15 carries a commutator 16 and a flywheel 17 thereon, both fixedly attached to the shaft 15 by means of a set screw 18 in the case of the commutator 16 and by a nut 19 in the case of the flywheel 17, thus allowing a simultaneous rotation of the shaft 15, the commutator 16 and the flywheel 17.

The base 11 also supports vertical rods 20 which welded or otherwise attached at the bottom to the base 11 and at the top to a retainer plate 21, thus forming the frame on which the cylinder 22 is carried.

This cylinder 22 is provided with one or more coils 23 which are constructed to allow a hole 24 to be centrally located vertically within the cylinder 22. If more than one coil is used they are connected together in any accepted way. A ground plate 25 is positioned between the bottom of the cylinder 22 and the retainer plate 21, the cylinder 22 being insulated from the ground plate 25 by insulation 22A and the ground plate 25 being attached to the retainer plate 21 by means of welding or other accepted methods. One lead of the coils 23 is connected to terminal 26 which in turn is connected to ground plate 25, also connected to terminal 26 is a wire 29. The other lead of coils 23 is connected to terminal 27 which is insulated from ground plate 25 by means of an insulating grommet 22A, also connected to terminal 27 is a wire 28. The opposite end of wire 29 is attached to the base 11 by means of terminal 30 or the like, while the free end of wire 28 is attached to batteries 31 or other source of electric supply.

A connecting rod 32 is attached at its lower end to the flywheel 17 by means of shaft 33 and nut 34 while the upper end of the connecting rod 32 is attached to a guide 35, movably connected thereto by means of a pin 36 or the like. Said guide 35 carries a guide bar 37 which works within a guide plate 38 provided with a face plate 39, connected together by means of screws 40 or the like. The guide plate 38 is attached to the retainer plate 21 by means of angle support 41 and screws or bolts 42 or other secure means.

Attached vertically and fixedly to the top of the guide 35 is a steel piston rod 43 by means of shrink fit or other means. A guide rod 44 is similarly attached to the top of the steel piston rod 43. Actually the only part of this new electric engine that must be made of steel is the piston rod 43. The rest of the engine may be made of any desired metal such as aluminum or the like. Plastic may be used but grounding must be provided between the shaft 15 and the cylinder 22, or the coils therein 23. The shaft 15 must be made of material that will conduct electricity.

Referring more particularly to Figures 1 and 5, the commutator 16 is composed of two parts, a brass section 16A and a section 16B which is made of hard rubber or other material which is non-conductive. Section 16A may be made of other materials so long as such material will conduct electricity. It should be noted that section 16A is constructed to allow contact to be made with the shaft 15.

Brushes 45 and 46 are attached to a swiveled Y-shaped frame 47 fulcrumed by pin 48. Said pin 48 being also attached to U-shaped frame 50 which is attached to the base 11 by means of bolt 51. A guide rod 52 is attached to the Y-shaped frame 47 above the point of fulcrum, said rod 52 being provided with a screw or the like 53 which receives one end of the wire 54. The other end of the wire 54 is connected to the batteries 31.

As stated above, the purpose of this new invention is to provide a new type electric engine which will not require constantly applied electric power, and with this in mind we will discuss the operation of this new electric engine.

As may be readily seen in Figure 1, a complete circuit is made from the battery or batteries 31 through the wire 28, the coils 23, the wire 29, the conductive portion 16A of the commutator 16, the brush 45 or 46, the Y-shaped frame 47, the guide rod 52, and the wire 54 which is connected to the batteries 31. But this complete circuit is possible only when the conductive portion 16A of the commutator 16 is in direct contact with the brush 45 or 46. The brush 45 as viewed in Figure 5, will cause the commutator to move in a counter-clockwise manner, while the brush 46 will cause the commutator to move in a clockwise manner.

This rotation of the commutator 16 will also cause the shaft 15 and the flywheel 17 to rotate in like manner.

The steel piston rod 43 together with the coils 23 work in the manner of a solenoid. When the brush 45 or 46 touches the conductive portion 16A of the commutator 16, the circuit as described above will be closed and the steel piston rod 43 is attracted to the magnetic force created within the coils 23 thereby centering within the coils 23 as seen more particularly in Figure 2. This upward movement of the piston rod 43 causes the connecting rod 32 to also rise thereby turning the flywheel 17 and thus the shaft 15 and commutator 16. This movement of the commutator 16 causes the conductive portion 16A to move past the brush 45 or 46, as the case may be, and as soon as the brush 45 or 46 contacts the non-conductive portion 16B of the commutator 16 the circuit is broken, the coils 23 loose their magnetic attraction and the weight of the piston rod 43, the guide 35 and connecting rod 32 cause them to move downward until the shaft 33, which connects the connecting rod 32 to the fly wheel 17, is at its lowest point. When this happens the commutator is in the approximate position as shown in Figure 5 with the conductive portion 16A again in a position to complete the circuit thus again raising the piston rod 43, which is again released as the brush 45 or 46 leaves the conductive portion 16A of the cummutator 16. This process is repeated over and over.

Thus power is applied to the shaft 15 by the upward and downward stroke of the steel piston rod 43, yet the electric power supply is used only for a portion of the time.

If the commutator 16 is made completely of conductive material, the constant application of electricity would cause the piston rod 43 to be stabilized within the coils 23, therefore the intermittent application of electricity is not only desirable but required.

It may be readily seen that by proportioning the conductive portion 16A of the commutator 16 with the stroke of the piston 43 a constant piston vertical action may be achieved within the coils 23.

A series of cylinders 22 may be used, such as two, four, six, or eight provided with one ground wire 29 for all cylinders. The commutator 16 would be composed of a number of discs insulated one from the other but banded together to form the one commutator, with each separate disc a complete commutator possessing the conductive portion 16A and the non-conductive portion 16B. A separate disc would have to be provided for each cylinder, and a separate brush would have to operate each disc or band. A distributor would be installed in the wire 28 allowing one wire to connect the distributor to the source of electric supply, but with separate wires connecting the distributor to each of the cylinders. A timing device would be installed to control the contact of the brushes with the discs or bands on the second wheel or commutator to allow the individual brushes to work in unison with the distributor so that a complete circuit between each cylinder and its band or disc would be completed at the proper time. In this way one or more cylinders could be operated at the same time.

Even with eight cylinders the circumferential length of the conductive material would not have to be any longer than for one cylinder since the momentum of the pistons would cause the next one to operate or progress far enough to allow contact with the commutator and thus complete a circuit, thus the individual disc portion 16A could be greatly shortened in their circumferential length.

It is realized by this inventor that other improvements will be developed as progress on this invention is made, but such improvements will still carry the basic principles forwarded herein, and as each improvement is perfected additional applications for Letters Patent will be filed.

The shape, construction, and form of the present invention will not necessarily remain as shown, but the principles of operation, such as the centering of the piston within the coils by application of electricity intermittently, and the moving of the piston creating motive power for the shaft will remain the same. It is to protect these basic applications and principles that I apply for this Letters Patent, therefore, I desire it to be understood that I reserve the right to make alterations and changes insofar as such alterations and changes are covered by the following claims:

I claim:

1. In an electric engine, an electric coil cylinder, a ground plate attached to said electric coil cylinder, a steel piston working within said electric coil cylinder, a flywheel, a connecting rod movably mounted and attached to the said steel piston and the said flywheel, a shaft fixedly mounted within said flywheel, bearings supporting said shaft, a base plate supporting said bearings, a disc shaped commutator mounted on said shaft, said commutator provided with predetermined portions of conductive and non-conductive materials on its circumferential surface, said conductive material extending inward to a point which allows contact with the said shaft, a ground wire connecting said ground plate and the said baseplate, one terminal of said electric coil cylinder connected to said ground plate, a live wire connecting the other terminal of said electric coil cylinder to the source of electricity, an operating wire connecting said source of electricity with said commutator as desired.

2. In an electric engine, a cylinder, said cylinder composed of a plurality of electric coils encased in a shell, a vertical hole placed centrally of the coils, said coils connected one to the other, a ground plate connected to one terminal of said coils, a retainer plate supporting said ground plate and said cylinder, a steel piston rod working within said vertical hole, a guide rod fixedly attached to the base of the steel piston rod, a laterally extending guide bar attached to the said guide rod, a grooved guide plate receiving said guide bar, said grooved guide plate fixedly attached to the bottom of the said retainer plate, a connecting rod movably attached to the bottom of the said guide rod, a flywheel, connecting means provided between the said connecting rod and the said flywheel at a predetermined point between the center and the outer rim of the said flywheel, a shaft fixedly attached at one end centrally within the said flywheel, a supporting base, bearings attached to the said supporting base, said shaft rotatably mounted within the said bearings, a disc shaped commutator fixedly mounted on the said shaft, a wire connecting said ground plate with the said base, a second wire connecting the other terminal of said coils with a source of electricity, a third wire attached at one end to the source of electricity and at the other end provided with means whereby contact may be made as desired between the source of electricity and circumferential edge of the said commutator, said commutator provided with a predetermined portion of its circumferential edge composed of conductive material projecting inward and making contact with the said shaft, a second predetermined portion of the said commutator composed of non-conductive material, means of support provided for the cylinder, said support connected to and supported by the said base, and means provided to allow the various working parts to operate together with ease and at the proper time.

3. In an electric engine, a rotatable shaft, means provided to support said shaft, a flywheel fixedly attached to one end of said shaft, a second wheel fixedly attached to the said shaft at a predetermined place thereon, said second wheel composed of conductive material on a predetermined portion of its circumferential surface and extending inward far enough to make contact with said shaft, the balance of said second wheel composed of non-conductive material, a connecting rod attached at the bottom to the flywheel at a predetermined point between the center and the circumferential edge of the said flywheel, a guide movably attached to the upper end of said connecting rod, means provided on said guide to allow a true vertical movement of the said guide, a vertical steel piston rod fixedly attached to the top of said guide, a vertical guide rod fixedly attached to the top of said steel piston rod, an electric coil cylinder, a hole placed vertically within the center of the said electric coil cylinder positioned to allow a free vertical movement of the steel piston rod therein, supporting means provided for the electric coil cylinder, means also provided to connect one terminal of said electric coil cylinder to an electric supply by one wire, grounding means provided between the other terminal of said electric coil cylinder and the supporting means of the shaft, a further means provided to allow a second wire from the electric supply to contact the circumferential surface of the second wheel mounted on the said shaft, and means provided in the combined parts to allow a continuous vertical upward and downward movement of the steel piston rod so long as the second wire from the electric supply is in contact with the second wheel, and means provided to assure the coordinated working together of the various parts.

References Cited in the file of this patent

UNITED STATES PATENTS

| | | |
|---|---|---|
| 357,374 | Darling | Feb. 8, 1887 |
| 841,975 | Irving | Jan. 22, 1907 |
| 1,291,819 | Forgel | Jan. 21, 1919 |
| 1,545,433 | Lee et al. | July 7, 1925 |
| 1,721,447 | Haney | July 16, 1929 |
| 1,889,040 | Moodyman | Nov. 1, 1932 |
| 2,169,539 | Shebol | Aug. 15, 1939 |
| 2,570,766 | Chenault | Oct. 9, 1951 |

FOREIGN PATENTS

| | | |
|---|---|---|
| 731,793 | France | May 31, 1932 |